United States Patent

Engelsiepen et al.

[11] Patent Number: 5,907,683
[45] Date of Patent: May 25, 1999

[54] SYSTEM FOR MAINTAINING A QUALITY OF SERVICE IN A MULTIMEDIA DATASTREAM SYSTEM BY INHIBITING BLOCKING OF REAL-TIME WRITES TO A MULTIMEDIA FILE SYSTEM

[75] Inventors: Thomas Eugene Engelsiepen, San Jose, Calif.; Partha Narayanan, Austin, Tex.

[73] Assignee: International Business Machines Corporation, Armonk, N.Y.

[21] Appl. No.: 08/755,865

[22] Filed: Dec. 2, 1996

[51] Int. Cl.$^6$ .................................................. G06F 13/00
[52] U.S. Cl. ............................ 395/200.61; 395/200.62; 395/200.47; 395/200.49; 395/200.78
[58] Field of Search ............................... 395/841, 200.61, 395/200.62, 200.47, 200.49, 200.78

[56] References Cited

U.S. PATENT DOCUMENTS

| 5,640,597 | 6/1997 | Noguchi et al. | 395/481 |
| 5,758,076 | 5/1998 | Wu et al. | 395/200.61 |
| 5,768,527 | 6/1998 | Zhu et al. | 395/200.61 |

*Primary Examiner*—Le Hien Luu
*Assistant Examiner*—Duc Lu

*Attorney, Agent, or Firm*—Robert M. Carwell

[57] ABSTRACT

A real-time write function is provided for a multimedia server system by reserving appropriate disk bandwidth for real-time needs at system configuration time. Blocks of a real-time record are avoided irrespective of the duration of the record which otherwise would occur while awaiting availability of system resources. A preseleted number of disk blocks are pre-allocated so as to keep ahead of the writing real-time application by a designated amount. A system administrative interface is provided to specify before and during the write the duration that the system is to keep ahead of the writing real-time application. Given the duration and the rate at which the application intends to write or record, the number of pre-allocated disk addresses is computed. The addresses are kept in a pre-allocation table maintained on a "per-open instance" basis. A real-time write application also reserves a determined number of prefetch buffers. A multimedia file system utilizes these buffers to store the application data, attaching deadlines by which these buffers are to be written to the multimedia file system. Every time a prefetch buffer is released, a determination is made that enough pre-allocated disk addresses are ready to be used without delay. The application is thereby assisted in sustaining the desired datastream rate it has specified and been granted by the multimedia file system.

9 Claims, 2 Drawing Sheets

SYSTEM FOR MAINTAINING A QUALITY OF SERVICE IN A MULTIMEDIA DATASTREAM SYSTEM BY INHIBITING BLOCKING OF REAL-TIME WRITES TO A MULTIMEDIA FILE SYSTEM

TECHNICAL FIELD

This invention relates to handling of datastreams in multimedia systems and, more particularly, to accommodating real-time writes to files in such systems to maintain quality of service (QOS).

BACKGROUND OF THE INVENTION

Most activities in a multimedia system tend to be of the real-time variety. Put simply, a real time system such as a video server is one in which, a datastream must be written to storage and accessed without delay or interruption. Such delays give rise to lost frames or dropout in program content which is unacceptable in these applications.

In other multimedia applications it may be possible to provide some delay to effect storage of data which is then played back at a later time. However, it should be readily apparent that again taking the video server or video-on-demand type of applications as examples, it would be completely unacceptable for viewers to experience blank spaces during their viewing of a favorite movie while the system is catching up with writes to disk.

Real-time applications have been known in the art for some time, such as in process control. However these systems may be distinguished over those in which the invention is particularly applicable in the sense that although they may involve real-time data, it is oftentimes permissible to miss portions of data for varying reasons. For example, in a process control situation, when data packets are missed, they may simply be transmitted at a later time in response to various error checking mechanisms. Alternatively, in such systems, it may be acceptable to simply miss frames of data in their entirety. Parameters may be measured on a cyclical basis at such a rate that any one frame of data may essentially be redundant. In other words another measurement will occur in a short enough period of time after the data dropout so as to cause the dropout to be insignificant.

These more forgiving aspects of other real-time applications simply are not possible in the multimedia real-time systems under consideration at present, as in the case of video-on-demand where the customers simply find it intolerable to miss any of the video datastream content. Examples of streaming data in such applications might include video title content being received from an archive server which is written into some disk array or other storage device and is being read out immediately to a plurality of clients. Similarly, a real-time press-conference might be transpiring, a sports event, or other datastream which may be incoming for example from a satellite link in real-time. In such instances it is essential that this data be recorded or written to a file essentially as it is incoming as a datastream, and moreover to provide for its readout to the clients at essentially the same rate without delay.

One problem in handling the latter type of real-time systems is precisely because there is simply no luxury of time to be able to temporarily halt the recording process and resume it later because of the data loss as a result of this to the end-user. Put simply, it is completely unacceptable to block the recording process due to resource allocation problems or the like for even a slight period of time.

This real-time write feature relates to a broader concept known in the field as a quality of service (QOS) constraint that multimedia file systems must adhere to in real-time applications. The need for such a QOS is extremely pronounced in multimedia-based system solutions as just explained, wherein the applications simply must have the ability to load and record multimedia content in real-time. One nuance of this problem is that multimedia files tend to be extremely large in size. Thus a need has arisen to provide system designs which provide for real-time writes which will never block while waiting for system resources (e.g., disk bandwidth, buffer allocation, and disk map allocation) irrespective of the size or duration of the incoming record.

Several approaches have attempted to address this problem, all of which are essentially predicated on some manner of intelligent estimating of the characteristics of the incoming datastream. Two characteristics of particular importance are the total expected size of the file to be written and the datastream rate, both of which are problematical to estimate for obvious reasons. For example in a real-time videoconference it may be difficult to estimate how long the videoconference will last. As to the datastream rate, one might have some idea as to what the incoming rate is but with little assurance, the guess is correct. Moreover, the rate may vary due to differing compression algorithms and the like.

Notwithstanding these limitations, one approach is to estimate as best one could how large the complete incoming file would be and the datastream rate, and then simply to allocate resources based upon this predetermined estimate through manual input.

A serious problem with this approach is that if one overestimates the required resources to handle the entire file which are then committed in advance to the datastream, this may compromise the quality of service of other applications whose requirements may be equally as demanding and involving perhaps hundreds or thousands of clients. If, on the other hand, needed resources based on these unreliable estimates are underestimated, the very real and serious risk of the particular application in question suffering frame dropouts and associated deterioration in QOS occurs, given that the real-time datastream might have to be interrupted until adequate resource is available.

Additionally, even if the estimate is right, merely dedicating statically a required resource allocation is oftentimes undesirable. Although the file size may have been accurately known a priori prior to transmission, events may occur during the transmission which alter this otherwise accurate estimate. This thereby would render any such static commitment of resource unwise and detrimental to optimum system performance and the ability to provide a balanced system so that no one application is penalized.

SUMMARY OF THE INVENTION

A real-time write function is provided for a multimedia server system by reserving appropriate disk bandwidth for real-time needs at system configuration time. Blocks of a real-time record are avoided irrespective of the duration of the record which otherwise occur while awaiting availability of system resources such as disk bandwidth, buffer allocation, and disk map allocation.

As a real-time write progresses, the file length increases such that more disk blocks are required to be allocated in which to store the data. As more and more such disk blocks are allocated, the allocation maps need to change the bit map settings; the allocation maps may be locked; or the allocation regions may have to be allocated and the like. All such activities result in non-deterministic delay which conventionally potentially compromises QOS for such real-time applications. While in some applications it may be ideal to completely eliminate non-determinism in disk block and/or allocation map allocation delay, in practice this is difficult. An alternative is provided by the subject invention by means of pre-allocation. In accordance with the invention, only a certain number of disk blocks are pre-allocated so as to keep ahead of the writing real-time application by a designated amount. A system administrative interface is provided to specify the duration that the system is to keep ahead of the writing real-time application. Given the duration and the rate at which the application intends to write or record, the number of pre-allocated disk addresses is computed.

This set of pre-allocated disk addresses is kept in a pre-allocation table maintained on a "per-open instance" basis. A real-time write application also reserves a determined number of prefetch buffers by means of a system call. A multimedia file system utilizes these buffers to store the application data, attaching deadlines by which these buffers are to be written to the multimedia file system. Every time a prefetch buffer is transferred from user to kernel space, a determination is made that enough pre-allocated disk addresses are ready to be used without delay. The application is thereby assisted in sustaining the desired datastream rate it has specified and been granted by the multimedia file system.

DETAILED DESCRIPTION OF THE PREFERRED EMBODIMENT

Figure 1:
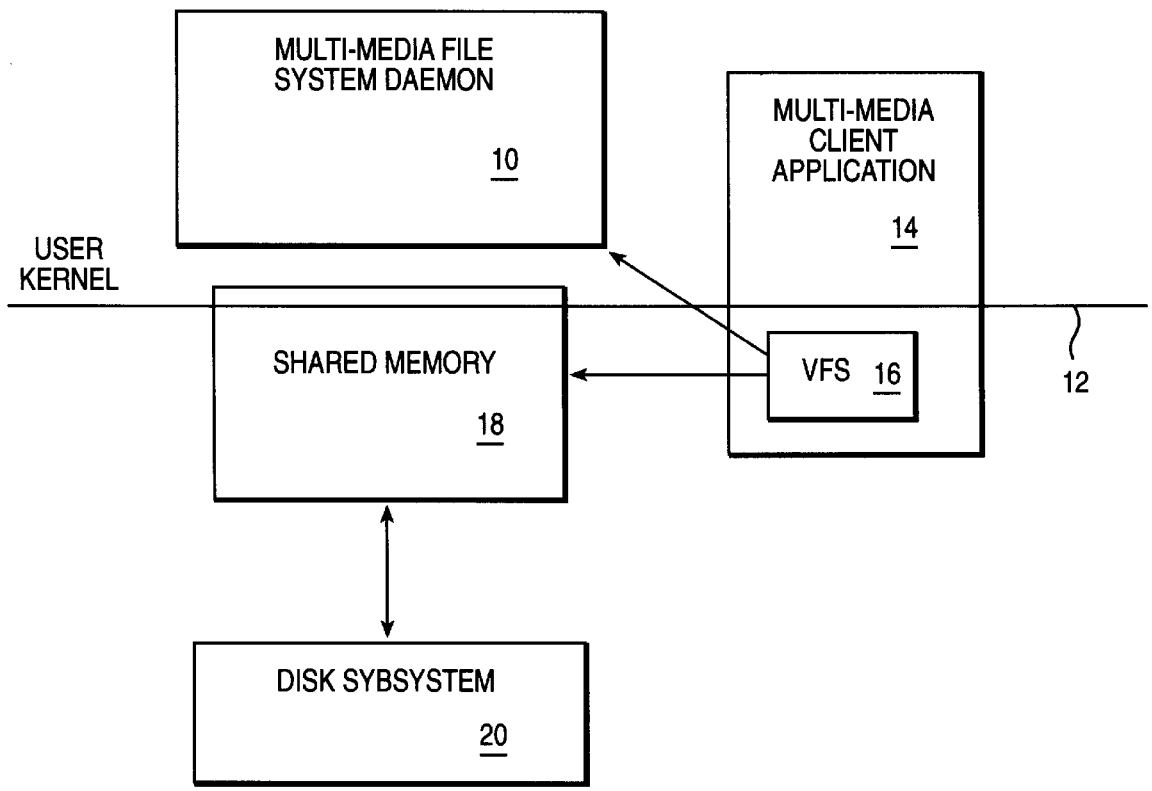
FIG. 1 is a functional block diagram of a multimedia server system of the invention employing a real-time write feature.

Referring first to FIG. 1, a block diagram of a multimedia datastream system in accordance with the invention is depicted therein which will now be described in greater detail. Such a system will include a multimedia file system daemon 10. This daemon essentially provides the functions of creating and updating the multimedia file system on an appropriate server system, and making sure that all of the resources for a particular multimedia file system employed are allocated. The daemon 10 also is employed to constantly update the record of the resource usage so that for example if a resource is no longer in use, the record is cleaned up so as to return the resource to a common pool for availability.

The system further includes one or more multimedia client applications 14 which represent multimedia applications that might, for example, be attempting to make a plurality of movie title datastreams available to users in the user space above line 12. Alternatively, for example, the application might be seeking to play an educational video to one or more classrooms in a school or might be seeking to load a particular video title to an archive server and thence to a file system for viewing.

The system includes in kernel space below line 12 a virtual file system layer corresponding to the video file system (VFS) 16. One purpose of the VFS 16 is to route play requests from the application 14 to the daemon 10 which performs the functions hereinbefore described. Based upon a request from the application 14 relayed through the VFS 16 to the daemon 10, the daemon will return a file handle to the application. The MMFS daemon sets up a shared memory which can be accessed by the VFS layer on behalf of the clients. A disk subsystem 20 is further provided which retains in appropriate storage such as RAID 5 disk arrays, the multimedia data such as digitally stored movie titles which are streamed into appropriate buffers in the shared memory 18 in a manner to be hereinafter described.

Figure 2:
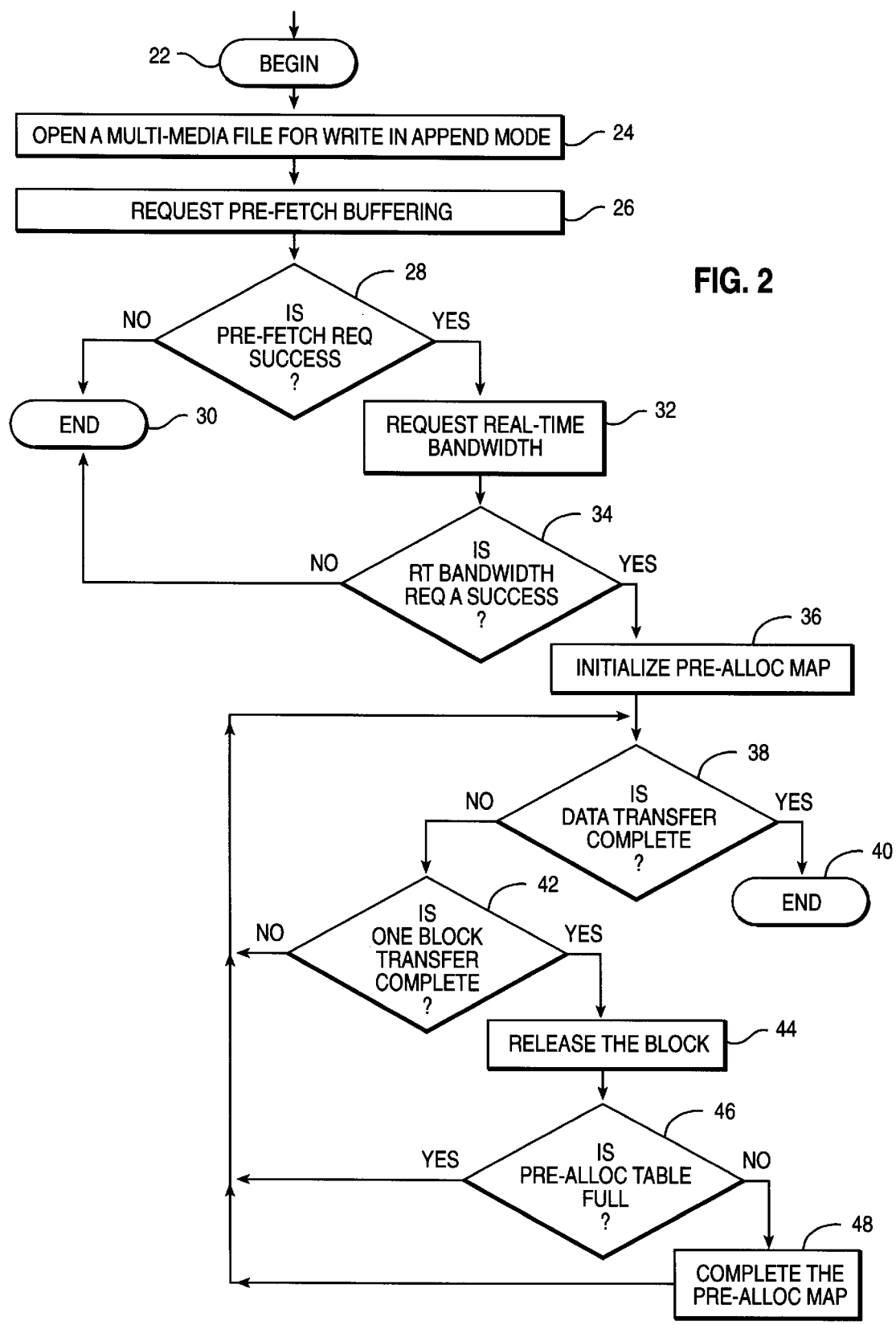
FIG. 2 is a flow diagram implementable in program code executing on the system of FIG. 1 for effecting a real-time write function in a multimedia file system of the invention.

Turning now to FIG. 2, depicted therein is a flow diagram of a real-time write function of the invention to be implemented in program code executing upon the system of FIG. 1 in order to effect the aspects and benefits of the invention herein described. For the most part the functionality depicted in FIG. 2 is being implemented in the MMFS daemon 10 described with reference to FIG. 1. The daemon performs various tasks through multiple threads with appropriate thread synchronization.

When the multimedia system of FIG. 1 is first started, the daemon 10 creates a multimedia file system (MMFS). In the MMFS, flexibility is provided for specifying the number of buffers which may desirably be required for prefetch buffering of the data file to be streamed. Flexibility is further provided by the MMFS and the system of FIG. 1 to enable the system to determine how far ahead of a current write it is desired to allocate system resources for. From the discussion of the background of the invention, it will be recalled that it is undesirable to overestimate the request of the amount of resource which should be reserved ahead of the real-time write so as to avoid unnecessary or unattainable capability from the resources. As a representative example, it may be likely that, in a given application, it is desirable to reserve enough resources to remain 5 seconds ahead of the real-time write process in terms of system resources available. This is in order to provide the datastream associated with this 5 seconds a "safety zone" of system resources which will be known to be available. In the system, this predetermined time ahead of the write will be bounded to a preset number such as the aforementioned 5 seconds.

Once the file system is thereby created and mounted, it is ready for use by one of the clients 14. It will now be assumed that in response to execution of the client application 14 there is a desire to effect a real-time write to the system of FIG. 1. One scenario in which this might occur is if it is assumed that a title has already been loaded onto an archive server and it is desired to transfer it to the MMFS where it may be utilized from thereon to provide datastreams to end-users in response to the application 14. In addition to the streaming in just described with respect to the archive server, the end-users through the client application 14 may be requiring a like datastream out of the data being loaded into the MMFS by the archive server so that the end-users may view their selected titles. In this scenario the title may be streamed into the MMFS, perhaps with a slight preload time, while at the same time the data is streaming out of the MMFS to the end-users.

Yet another representative scenario may be envisioned wherein the system of FIG. 1 may be employed. In this case, it may be envisioned that real-time data is coming in originating from a network, satellite link, or the like, wherein the content is real-time video from a press-conference or the like. In this case, as the datastream from the real-time video is read in, it would be desirable to load the datastream into the MMFS while still having the capability of streaming it out for observation for example, to ensure that the recording process is operating correctly.

In both of the aforementioned scenarios, before a real-time write is effected, it is necessary to create a file in which the datastream will be stored. In a request for a write, this write may be associated with real-time data, but it also may be associated with non real-time data for which the functionality of the invention is not required. For this reason, in a multimedia client application 14, provision is made for setting the rate of the datastream of the particular file of interest. By default, if no such rate is set by the application, it is assumed to be a non real-time file and treated in a conventional manner.

On the other hand, if it is detected as being a real-time file, a multimedia file is accordingly opened for the write function in the "append" mode, step 24 of FIG. 2. The significance of this "append" mode is as follows. For multimedia file writes involving real-time datastreams, in an append mode no facility is made for rewriting over portions of the file given that the data is coming in in real-time. Thus, the MMFS includes this "append" mode which is set when a real-time datastream is detected so as to prevent any attempt to rewrite over the file or access differing portions during the write.

The MMFS has a certain number of buffer pools at its disposal. Since many applications 14 may be executing at a given time, each with their associated plurality of clients, it is desirable to make sure that each such application has a certain number of buffers associated therewith and allocated for its own activity. Accordingly, at step 26, a request is made by an application for prefetch buffering to the MMFS by means of a call instructing the MMFS daemon 10 that it is desired to allocate by the application a quantity of prefetch buffering. If the buffering is available at the time of the request, the request will succeed. This is shown by the decision block 28 wherein, if the buffering is available, the prefetch request is successful, in which case flow exits through the bottom of decision block 28. Obviously if the prefetch request is not successful, flow exits to the left of block 28 and the subroutine ends at block 30. It is not essential that the functions of blocks 26 and 32 occur in the order depicted. For example the request for prefetch buffering 26 could occur, followed by the request for real-time bandwidth 24, and the invention accordingly admits to either implementation.

If the prefetch buffering request is successful, the next step in the process of FIG. 2 is an attempt to set the real-time rate, e.g., requesting a real-time write bandwidth shown at step 32. Here again, the real-time rate will be dependent upon various parameters affecting the performance of the system, such as the number of disks which one has available in the system, etc. The more disks available, the more throughput the disks can support. Accordingly, the system of FIG. 1 at a given time, when it configures the file system, will have determined the maximum disk bandwidth that it can support spread over multiple applications 14. Thus, at the time of the real-time bandwidth request, 32, if the system and the MMFS have not committed all of its resources and has some bandwidth left, the request for bandwidth 32 will be satisfied. As shown at block 34 a test is performed of whether this request for real-time bandwidth has been a success.

If this request for real-time bandwidth fails, the process exits the decision block 34 to the left and the process ends, 30. If, on the other hand, the real-time bandwidth request is successful, flow exits the bottom of block 34, signifying that a real-time write must be effected by the system. In this event, the system will automatically initialize a pre-allocation map, 36. It will be recalled from the previous discussion that in accordance with the teachings of the invention it is desirable to stay ahead of the real-time write by a prescribed amount defined at the time the system is initialized (although it may be dynamically adjusted later). It is desirable that all of the necessary resources are thus allocated in advance such as the pre-allocation map, the inodes, the allocation regions, and the like, at which time the system is ready to perform the real-time writes at which point the system is at block 38 of FIG. 2.

Until all of the incoming datastream is written, the system will continue to effect the real-time write by a plurality of block writes from the buffers—this state being tested by the decision block 38. If the test indicates that the entire data transfer is complete (e.g., the file is written), the process exits to the right of block 38 and ends at step 40. It will also be recalled that previous discussion was provided regarding the certain number of prefetch buffers allocated. Data in these buffers will be transferred from the user space above line 12 to the kernel space below line 12. When a first of these prefetch buffers has had its data so transferred from the user to kernel space, the buffer's function at this particular time has completed It is desirable, to avoid thereafter tying this buffer up unnecessarily because this may effect an inability to satisfy other requests for datastreams. Accordingly, it is desirable to release this buffer.

At step 42 therefore, a test is made of whether a block transfer has been completed of data associated with this buffer. If not, the process loops to the left of block 42 back to the test at block 38. On the other hand, if the block has successfully transferred its data to the kernel space, the buffer associated with the block is released, step 44, in which case the process continues to block 46. The release of a prefetch buffer, may in turn, result in a fetch of prefetch buffer for subsequent use. It is worth noting that this fetch is done by an asynchronous thread in the daemon.

At the time of release of the buffer, it is desirable to know whether the system is okay in relation to in terms of the pre-allocation of resources monitored in the pre-allocation map. In other words, it is desirable to know at this point if the system is still keeping ahead by the prescribed amount (such as 5 seconds) of the ongoing real-time write. For example, the system might only be 2 seconds ahead of the buffer or 3 seconds ahead of the real-time write. A sliding window may be visualized whereby it is desirable through the system to always keep ahead of the write by the prescribed window width of, for example, 5 seconds.

A test is therefore made of whether the pre-allocation table is full, 46. If the answer is in the affirmative, this signifies that in fact the system is the certain prescribed amount ahead of the ongoing write process, in which case the process loops back to block 38 to continue the write process. On the other hand, if the system is not ahead of the data by the prescribed amount, as indicated by the response to the test 46 being in the negative, the process proceeds to block 48. This point might indicate that the system is only 3 seconds ahead of the data write, contrary to the prescribed requirement that a 5 second window be maintained. In this instance, it is necessary to complete the pre-allocation map, step 48, so that the system in fact does remain ahead of the write process by the prescribed amount such as 5 seconds. While this step is being completed by an independent thread in the daemon, the process loops back to block 38 to continue the write process until the transfer of data is complete, step 40.

An important point in light of the foregoing is that as a buffer is released, the system ensures all of the allocations and resources that the application might need to retain this window of safety is always at the system's disposal so that it at no time will a write be blocked because of the resource allocation. The system thus is always forced into ensuring that the predetermined amount of time's worth of resource allocation is at the disposal of the file system so that the criteria may be satisfied of remaining ahead of the write by the prescribed amount.

While the invention has been shown and described with reference to particular embodiments thereof, it will be understood by those skilled in the art that the foregoing and other changes in form and detail may be made therein without departing from the spirit and scope of the invention.

We claim:

1. For use in a multimedia datastream system having a multimedia file system, a video server, and an application executing on a client, a method for maintaining a quality of service for said datastream having a corresponding file size, said method comprising:

processing in said system a request from said client for a write to said multimedia file system;

determining a data rate corresponding to said datastream; and executing a real-time write of said datastream to said multimedia file system at a rate sufficient to maintain said quality of service for said datastream in response to said request and said determining said data rate, wherein said real-time write is a plurality of writes to said multimedia file system sufficient to temporarily store in sequence in shared memory of said system said data stream; and wherein said method further includes:

inhibiting the blocking of any of said plurality of writes;

preselecting a time interval corresponding to said data rate; and reserving system resources of said system ahead of each of said writes in an amount sufficient to write a next portion of said datastream to said shared memory and said multimedia file system to be received during said preselected time interval.

2. The method of claim 1 further including:

building said multimedia file system in response to said request.

3. The method of claim 2 further including:

specifying said predetermined time interval during said build.

4. The method of claim 3 further including:

determining that said request is for a write not requiring maintenance of said quality of service; and executing a non-real-time write of said datastream in response to said determining.

5. An apparatus for maintaining a quality of service for a datastream corresponding to a file size in a multimedia datastream system having a multimedia file system, a video server, and an application executing on a client, said apparatus comprising:

means for processing a request in said system for a write to said multimedia file system from said client;

means for determining a data rate corresponding to said datastream; and means for executing a real-time write of said datastream to said multimedia file system at a rate sufficient to maintain said quality of service for said datastream in response to said request and said determining said data rate, wherein said real-time write is a plurality of writes to said multimedia file system sufficient to temporarily store in sequence in shared memory of said system said data stream; and wherein said apparatus further includes:

means for inhibiting the blocking of any of said plurality of writes;

means for preselecting a time interval corresponding to said data rate; and means for reserving system resources of said system ahead of each of said writes in an amount sufficient to write a next portion of said datastream to said shared memory and said multimedia file system to be received during said preselected time interval.

6. The apparatus of claim 5 further including:

means for building said multimedia file system in response to said requests.

7. The apparatus of claim 6 further including:

means for specifying said predetermined time interval during said build.

8. The apparatus of claim 7 further including:

means for determining that said request is for a write not requiring maintenance of said quality of service; and means for executing a non-real-time write of said datastream in response to said determining.

9. For use in a multimedia datastream system having a multimedia file system, a video server, and an application executing on a client, a method for maintaining a quality of service for said datastream having a corresponding file size, said method comprising the steps of:

opening a multimedia file for a real-time write in append mode;

requesting prefetch buffering;

testing for success of said request for prefetch buffering;

requesting real-time bandwidth in response to a successful said testing for said success of said request for prefetch buffering;

testing for success of said request for real-time bandwidth;

initializing a pre-allocation map in response to successful said testing of said request for real-time bandwidth;

testing whether data transfer corresponding to said file is complete;

testing in response to said test of whether said data transfer is complete of whether a block transfer is complete;

in response to said testing for whether said block transfer is complete, releasing said block;

testing for whether a pre-allocation table of said pre-allocation map is full; and completing said pre-allocation map in response to said releasing said block and said test for whether said pre-allocation table is full.

* * * * *